Patented Jan. 17, 1950

2,494,687

UNITED STATES PATENT OFFICE 2,494,687

OXIDATION OF MERCAPTANS IN THE PRESENCE OF C-NITROSO AROMATIC COMPOUNDS

Donald C. Bond, Northbrook, Ill., assignor to The Pure Oil Company, Chicago, Ill., a corporation of Ohio No Drawing. Application November 15, 1947, Serial No. 786,313

20 Claims. (Cl. 196—29)

This invention relates to a method of oxidizing mercaptans, and more particularly to a method of oxidizing mercaptans contained in hydrocarbon liquids either while present in the liquid or after extraction therefrom.

An object of the invention is to oxidize mercaptans to disulfides.

Another object of the invention is to provide a method for sweetening gasoline and other hydrocarbon liquids containing mercaptans.

Still another object of the invention is to provide a method for regenerating alkali solutions which have been used to extract mercaptans from hydrocarbon liquids.

Other objects of the invention will be apparent from the following description.

I have discovered that C-nitroso phenols and aromatic amines are excellent catalysts for promoting the oxidation of mercaptans to disulfides in the presence of an alkali solution under ordinary atmospheric conditions. C-nitroso aromatic compounds containing amino and/or hydroxyl groups in general are effective except those compounds in which each hydroxyl or amino group is in a position meta to an adjacent hydroxyl or amino group. As examples of compounds which are effective in promoting oxidation of mercaptans in accordance with my invention may be mentioned p-nitrosophenol, 2-nitroso-1-naphthol, o-nitroso-m-cresol, p-nitrosodiethylaniline, beta-nitrosodimethylaniline, p-nitrosodiphenylaniline, nitrosothymol and 1-nitroso-2-hydroxy-4-diethylamino benzene. As an example of a C-nitroso compound which is inactive may be mentioned nitroso resorcinol, in which the hydroxyl groups are in positions meta to each other. Nitrosophloroglucinol is an example of another nitroso compound which is inactive since in this compound each hydroxyl group is in meta position to an adjacent hydroxyl group.

In order to demonstrate the effectiveness of compounds within the scope of my invention in promoting the oxidation of mercaptans to disulfides, a number of different compounds were subjected to a standard test as follows: a 50 cc. sample of caustic soda solution containing 10% by weight of sodium hydroxide, 1% by weight of catalyst, and 1% by weight of sulfur in the form of normal butyl mercaptan was placed in a 100 cc. graduated cylinder containing 75 cc. of No. 4 glass beads. A tube was placed in the cylinder so that the bottom thereof extended to the bottom of the cylinder, and air was passed through the tube and bubbled through the solution for one hour at the rate of 0.03 cubic foot per hour at a temperature of approximately 75° F. At the end of the bubbling period the mixture was analyzed for disulfides in order to determine the amount of mercaptan that was oxidized. The various solutions tested and the per cent of mercaptan oxidized in each test is given in the following Table I.

TABLE I

| Catalyst | Per cent of Mercaptan Oxidized |
|---|---|
| None | 0.9 |
| phenol | 0.5 |
| p-nitrosophenol | 61.0 |
| resorcinol | 0.2 |
| nitroso resorcinol | 0.7 |
| alpha-naphthol | 1.4 |
| 2-nitroso-1-naphthol | 9.3 |
| beta-naphthol | 2.2 |
| 1-nitroso-2-naphthol | 11.9 |
| o-nitroso-m-cresol | 56.6 |
| p-nitrosodiethylaniline | 35.7 |
| beta-nitrosodimethylaniline | 27.9 |
| p-nitrosodiphenylamine | 9.0 |
| nitrosothymol | 17.6 |

The foregoing table demonstrates the effectiveness of the nitroso group in promoting the catalytic oxidation properties of the compounds. The blank test containing no catalyst gave a result of 0.9% of butyl mercaptan oxidized. Phenol gave a result of 0.5% indicating it had no activity. Para-nitroso phenol on the other hand oxidized 61% of the butyl mercaptan. A comparison of alpha-naphthol and 2-nitroso-1-naphthol and of beta-naphthol with 1-nitroso-2-naphthol further demonstrates the effect of the nitroso group. A comparison of resorcinol and nitroso resorcinol indicates that the nitroso group has substantially no effect in enhancing the catalytic properties of resorcinol, which is itself an inactive substance insofar as it has any ability to promote oxidation of mercaptans.

The amino compounds act substantially in the same manner as the phenols, due undoubtedly to the fact that the amino compounds hydrolyze in alkali solution to form the phenols. For example, p-nitroso-diethylaniline in 10% sodium hydroxide solution hydrolyzed to a considerable extent to diethylamine and p-nitroso phenol after standing at room temperature for 48 hours.

Where it is desired to oxidize mercaptans to disulfides, the mercaptans per se are dissolved in a solvent such as hydrocarbon liquid, are intimately contacted with an alkali solution containing dissolved therein a small amount of C-nitroso compound, and oxygen or a gas containing free oxygen such as air is bubbled through the mixture. Various alkali solutions are useful. I prefer solutions containing 5% to 25% of sodium and/or potassium hydroxide dissolved in a medium in which hydrocarbons and disulfides are not soluble or only slightly soluble such as water, methyl alcohol, ethyl alcohol, glycol or any mixture thereof. C-nitroso compound is dissolved in the solution in amounts ranging from approximately 0.1% to 3% by weight of the solution. In the case of nitroso compounds which are not soluble in the alkali solutions, a solubilizer such as cresol may be added.

Where the invention is utilized in sweetening hydrocarbon liquids such as gasoline or kerosene, the liquid is intimately contacted with the alkali solution either by agitation or by countercurrent contact in a tower supplied with contacting surfaces while bubbling air through the tower or agitator.

In order to promote more intimate contact between the mercaptans and the alkali solution, it may be desirable to add to the alkali solution solubility promoters such as isobutyric acid and alkali metal butyrates or naphthenic acids and alkali metal naphthenates, together with cresols to hold the naphthenates in solution.

If it is desired to use the invention in the regeneration of used alkali solutions which have been used to extract mercaptans from hydrocarbon liquids such as gasoline and kerosene under conditions to prevent any substantial oxidation of mercaptans in situ, the used alkali solution after separation from the liquid hydrocarbon is contacted with alkali solutions of the nature above described in the presence of air. Such contact is suitably effected in a packed tower in which the air is passed upwardly countercurrent to the downward flowing stream of alkali solution. In the extraction of mercaptans from hydrocarbon liquids I prefer to use a sodium or potassium hydroxide solution containing not less than 10% by weight of free alkali metal hydroxide and not more than about 25% by weight thereof. I also prefer to use alkali solutions containing solubility promoters for mercaptans such as naphthenic acids and alkali metal naphthenates together with cresols or isobutyric acid and alkali metal butyrates in order to improve the extraction coefficient of the solution for mercaptans.

Regardless of which type process is used, care should be exercised not to contact the alkali solution containing the C-nitroso compound with air or other oxidizing agent in the absence of mercaptans. The C-nitroso compounds are destroyed by excessive oxidation, whereas if oxidation is controlled so as to maintain a small amount of mercaptan in the alkali solution undergoing regeneration or to stop oxidation when substantially all mercaptans in contact with the alkali solution have been converted to disulfides, the catalyst can be used repeatedly requiring only small make-up additions from time to time. Exhaustion of the catalyst is indicated by a decreased rate of oxidation.

In carrying out my process the mercaptans or hydrocarbon liquids containing mercaptans may suitably be contacted with from 5% to 50% by weight of alkali solution. The amount of alkali solution used is not critical. Larger amounts result in faster oxidation of mercaptans or in more complete extraction of mercaptans from the hydrocarbon liquid.

Although it has been previously indicated that my catalysts are effective at ordinary atmospheric conditions, oxidation may be effected under superatmospheric pressure and at slightly elevated temperatures up to approximately 150° F. Higher temperatures have a detrimental effect on the life of the catalyst.

This application is a continuation-in-part of application Serial No. 525,096, filed March 4, 1944, entitled "Removal of mercaptans from hydrocarbons."

What is claimed is:

1. The method of oxidizing mercaptans to disulfides comprising, intimately contacting said mercaptans with oxygen in the presence of an alkali solution and a small amount of a C-nitroso compound selected from the group consisting of aromatic amines and phenols in which amino groups of the amines and hydroxyl groups of the phenols are ortho or para to other amino or hydroxyl groups in the ring.

2. Method in accordance with claim 1 in which the C-nitroso compound is a nitroso phenol.

3. Method in accordance with claim 1 in which the C-nitroso compound is an aromatic nitroso amine.

4. Method in accordance with claim 1 in which the C-nitroso compound is an aromatic compound containing both amino and hydroxyl groups.

5. Method in accordance with claim 1 in which the C-nitroso compound is p-nitroso phenol.

6. Method in accordance with claim 1 in which the C-nitroso compound is o-nitroso m-cresol.

7. Method in accordance with claim 1 in which the C-nitroso compound is p-nitrosodiethylaniline.

8. The method of regenerating alkali solution containing mercaptan extracted from a hydrocarbon liquid comprising, intimately contacting said solution with air, the solution containing a C-nitroso compound of the group consisting of aromatic amines and phenols in which amino groups of the amines and hydroxyl groups of the phenols are ortho or para to other amino or hydroxyl groups in the ring.

9. Method in accordance with claim 8 in which the C-nitroso compound is a phenol.

10. Method in accordance with claim 9 in which the C-nitroso phenol is p-nitroso phenol.

11. Method in accordance with claim 9 in which the C-nitroso phenol is o-nitroso m-cresol.

12. Method in accordance with claim 8 in which the C-nitroso compound is an aromatic amine.

13. Method in accordance with claim 12 in which the C-nitroso aromatic amine is p-nitrosodiethylaniline.

14. Method in accordance with claim 8 in which the C-nitroso compound is an aromatic compound containing both amino and hydroxyl groups.

15. The method of sweetening hydrocarbon liquid containing mercaptans comprising, bringing said liquid into intimate contact with air and alkali solution containing a small amount of a C-nitroso compound of the group consisting of aromatic amines and phenols in which amino groups of the amines and hydroxyl groups of the phenols are ortho or para to other amino or hydroxyl groups in the benzene ring.

16. Method in accordance with claim 15 in which the C-nitroso compound is a C-nitroso phenol.

17. Method in accordance with claim 16 in which the C-nitroso phenol is p-nitroso phenol.

18. Method in accordance with claim 16 in which the C-nitroso phenol is o-nitroso m-cresol.

19. Method in accordance with claim 15 in which the C-nitroso compound is a C-nitroso aromatic amine.

20. Method in accordance with claim 15 in which the C-nitroso compound is a C-nitroso compound containing both amino and hydroxyl groups.

DONALD C. BOND.

REFERENCES CITED

The following references are of record in the file of this patent:

UNITED STATES PATENTS

| Number | Name | Date |
|---|---|---|
| 2,413,945 | Bolt | Jan. 7, 1947 |
| 2,426,087 | Fetterly | Aug. 19, 1947 |
| 2,427,212 | Henderson et al. | Sept. 9, 1947 |

FOREIGN PATENTS

| Number | Country | Date |
|---|---|---|
| 126,544 | Hungary | Mar. 17, 1941 |

OTHER REFERENCES

Bond, "Regeneration of Caustic Solutions . . . by Catalytic Air Oxidation," reprint from Oil and Gas Journal of December 8, 1945.